Sept. 12, 1961

LE ROY A. BROMLEY 2,999,796

MULTIPLE UNIT CENTRIFUGAL EVAPORATOR

Filed Feb. 9, 1959

INVENTOR.
LeROY A. BROMLEY

BY

ATTORNEYS

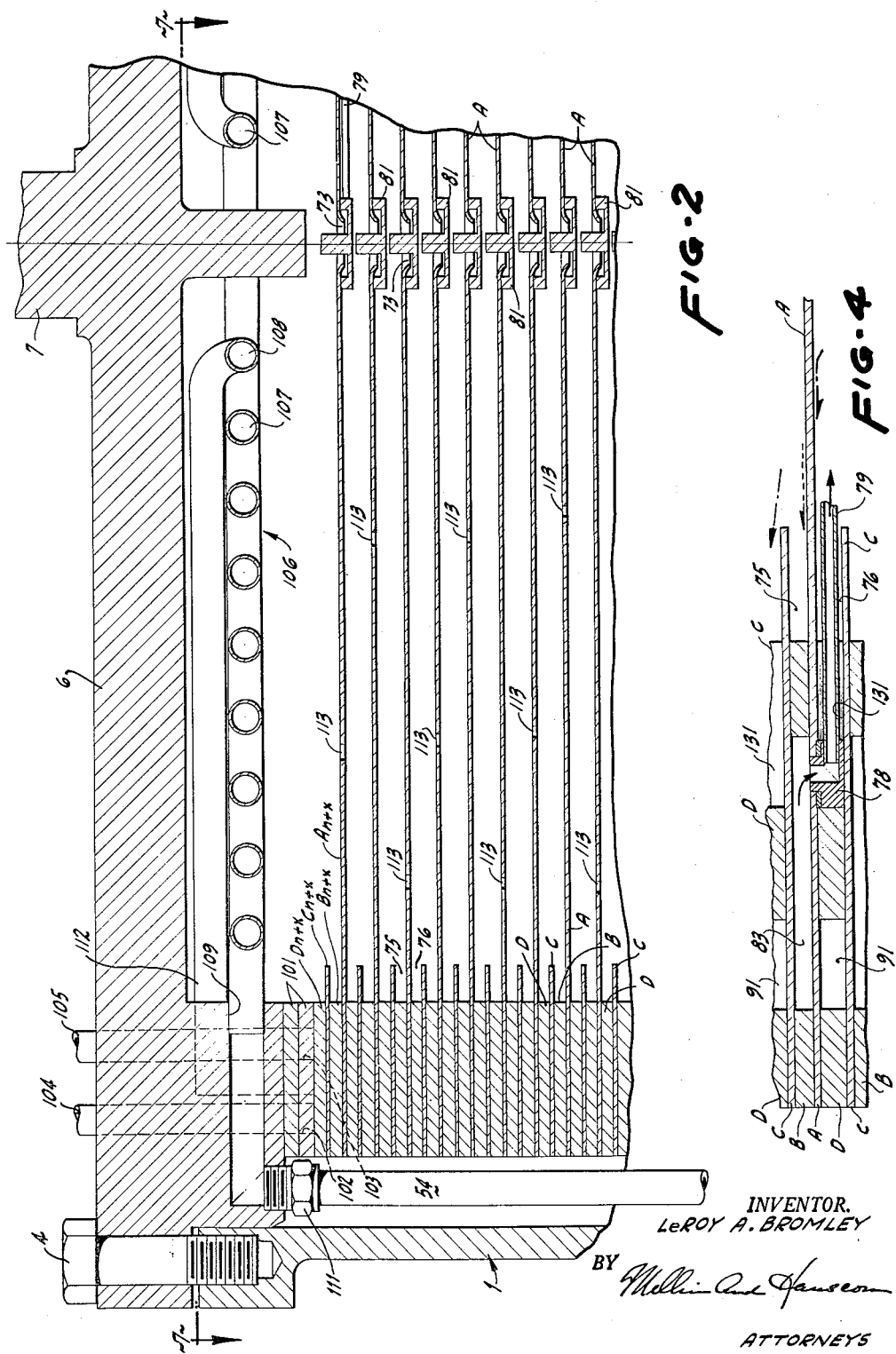

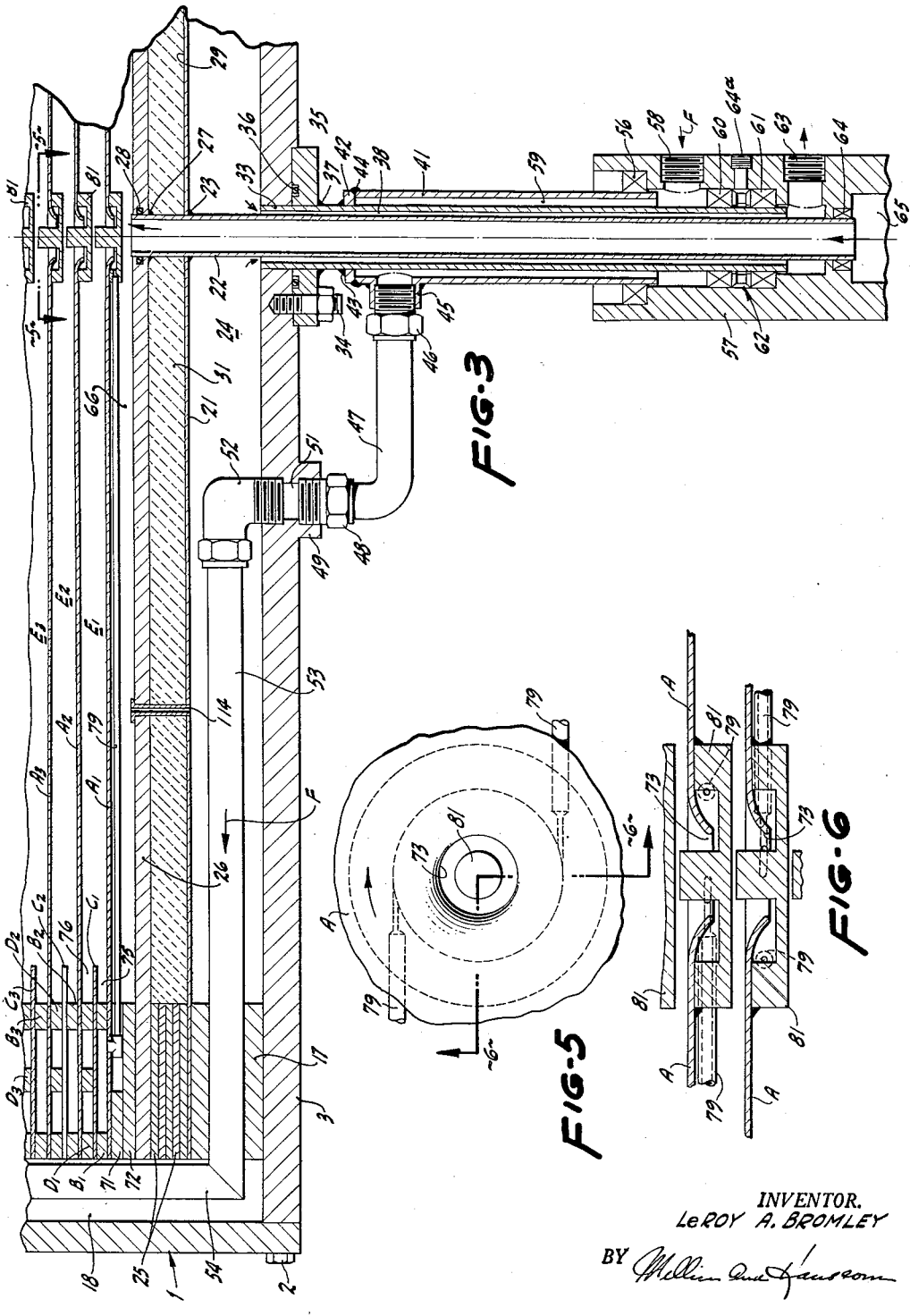

INVENTOR.
LeROY A. BROMLEY

ATTORNEYS

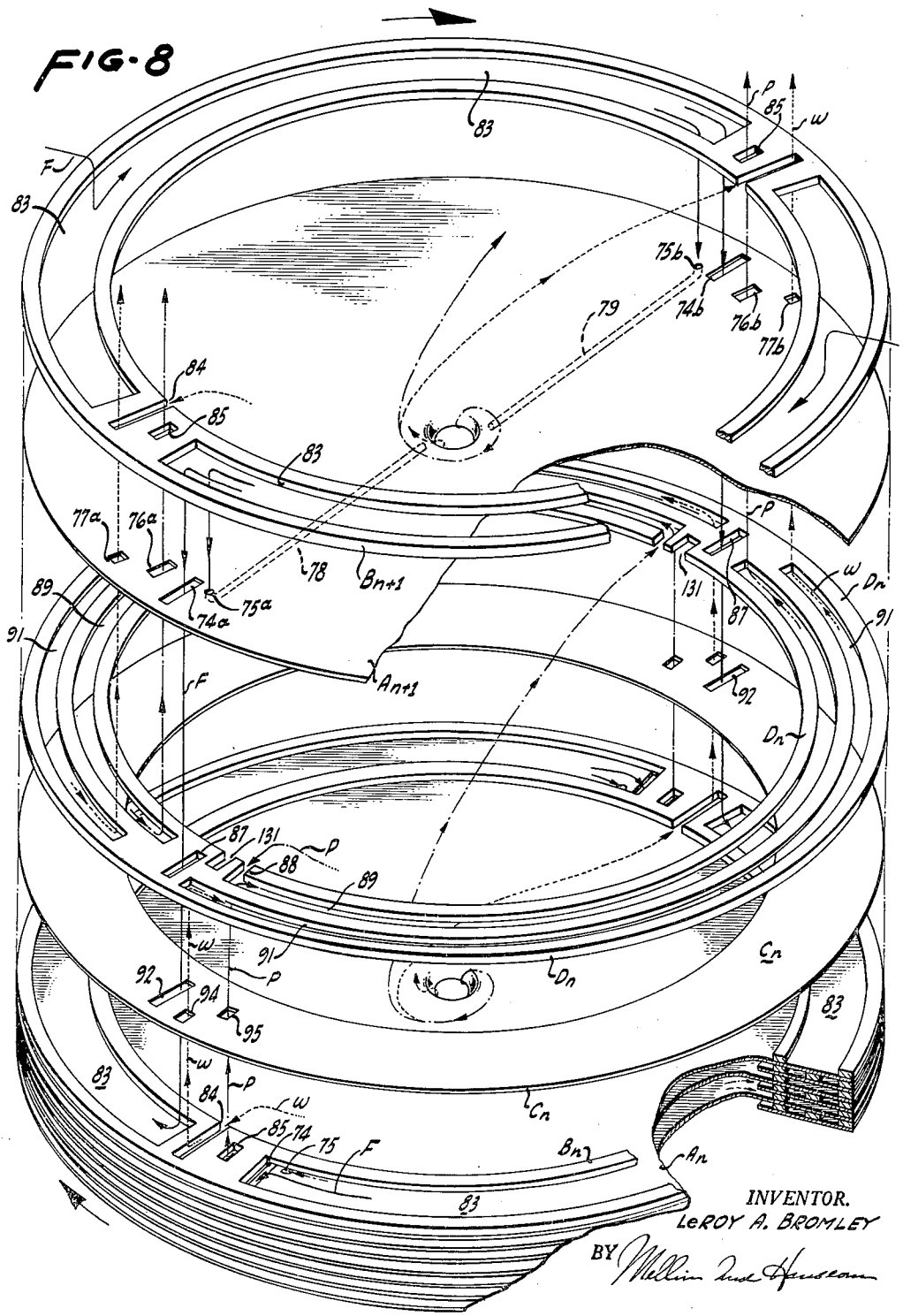

United States Patent Office 2,999,796
Patented Sept. 12, 1961

2,999,796
MULTIPLE UNIT CENTRIFUGAL EVAPORATOR
Le Roy A. Bromley, Berkeley, Calif., assignor to The Regents of the University of California, Berkeley, Calif.
Filed Feb. 9, 1959, Ser. No. 791,949
7 Claims. (Cl. 202—236)

This invention relates to and in general has for its object the provision of a multiple effect centrifugal evaporator.

With the passage of time the need for equipment and methods for effectively and economically producing potable water from sea water has become more pressing. Although considerable effort and money have been expended to this end by private industry and the Government, to date no commercially acceptable solution to this problem has been forthcoming.

More specifically, the object of this invention is the provision of a multiplicity of stacked evaporating chambers mounted for rotation on a vertical axis and wherein each such chamber includes a first or lower evaporating disc on which is stacked a first gasket ring, a metal separator ring, a second gasket ring, and a second or upper evaporating disc, the latter disc serving also as the first or lower evaporating disc of the next succeeding evaporator disc. Mounted on the lower face of each disc is a central feed water distributing cup communicating with the upper central portion of such disc and communicating with a conduit underlying said disc with a feed water port formed in the disc. Formed in the gasket rings are elongated circular channels serving as conduits and heat exchangers for the feed water, waste water, and end product. The feed water channels constitute a feed water header extending from the top of the evaporator to its bottom in a tortuous path for distributing feed water to each of the evaporator discs. As the feed water flows through the system it picks up heat from the various units. The waste water channels progress upwardly from the bottom to the top of the evaporator in a tortuous path receiving waste water from the periphery of each evaporator disc, such waste water giving up some of its heat to the feed water as the feed water progresses downwardly through each unit. Likewise the end product (pure water) channels progress upwardly through the evaporator in a tortuous path receiving end product from the lower peripheral surface of each evaporator disc, such end product giving up some of its heat to the downwardly progressing feed water.

Another object of this invention is the provision in an evaporator of the character above described of means for bleeding each of its evaporating chambers of air dissolved from the feed water within the system.

A further object of this invention is the provision in an evaporator of the character above described of means for heating the lowermost evaporating disc so as to maintain a temperature differential between such disc and the next succeeding or overlying disc.

Still another object of this invention is the provision in an evaporator of the character above described of a condenser mounted above its uppermost disc and in heat exchange relationship therewith, and through which the feed water passes on its way to said feed water manifold.

Another object of this invention is the provision of an evaporator of the character above described wherein the spacing between contiguous evaporator discs is such that there is a very low pressure drop between them.

A further object of this invention is the provision of an evaporator of the character above described wherein a low temperature differential can be maintained between contiguous evaporator discs, sufficiently high to bring about evaporation from the floor of each evaporating chamber and to result in the condensation of the resulting vapor on the ceiling of each evaporating chamber.

Still another object of this invention is the provision of an evaporator such as above described wherein the evaporator is rotated at a sufficient speed to cause the feed water delivered to the floor of each evaporator chamber to move outwardly as a film over such floor and to cause the condensate to move outwardly as a film adhering to the ceiling of such chamber.

The invention possesses other advantageous features, some of which, with the foregoing, will be set forth at length in the following description where those forms of the invention which have been selected for illustration in the drawings accompanying and forming a part of the present specification are outlined in full. In said drawings, one form of the invention is shown, but it is to be understood that it is not limited to such form, since the invention as set forth in the claims may be embodied in other forms.

Referring to the drawings:

FIG. 2 is an enlarged fragmentary vertical section of the upper left hand portion of the evaporator illustrated in FIG. 1.

FIG. 3 is an enlarged fragmentary vertical section of the lower left hand portion of the evaporator illustrated in FIG. 1.

FIG. 4 is an enlarged fragmentary vertical section of the lower left hand vertical portion of the structure illustrated in FIG. 3 and particularly showing one of the feed tubes associated with the lower side of one of the evaporating discs.

FIG. 5 is a fragmentary horizontal section taken on the section line 5—5 of FIG. 3.

FIG. 6 is a fragmentary vertical section taken on the offset section line 6—6 of FIG. 5.

FIG. 8 is an exploded perspective view of the stacked discs and rings making up the evaporator structure of my invention.

Figure 1:
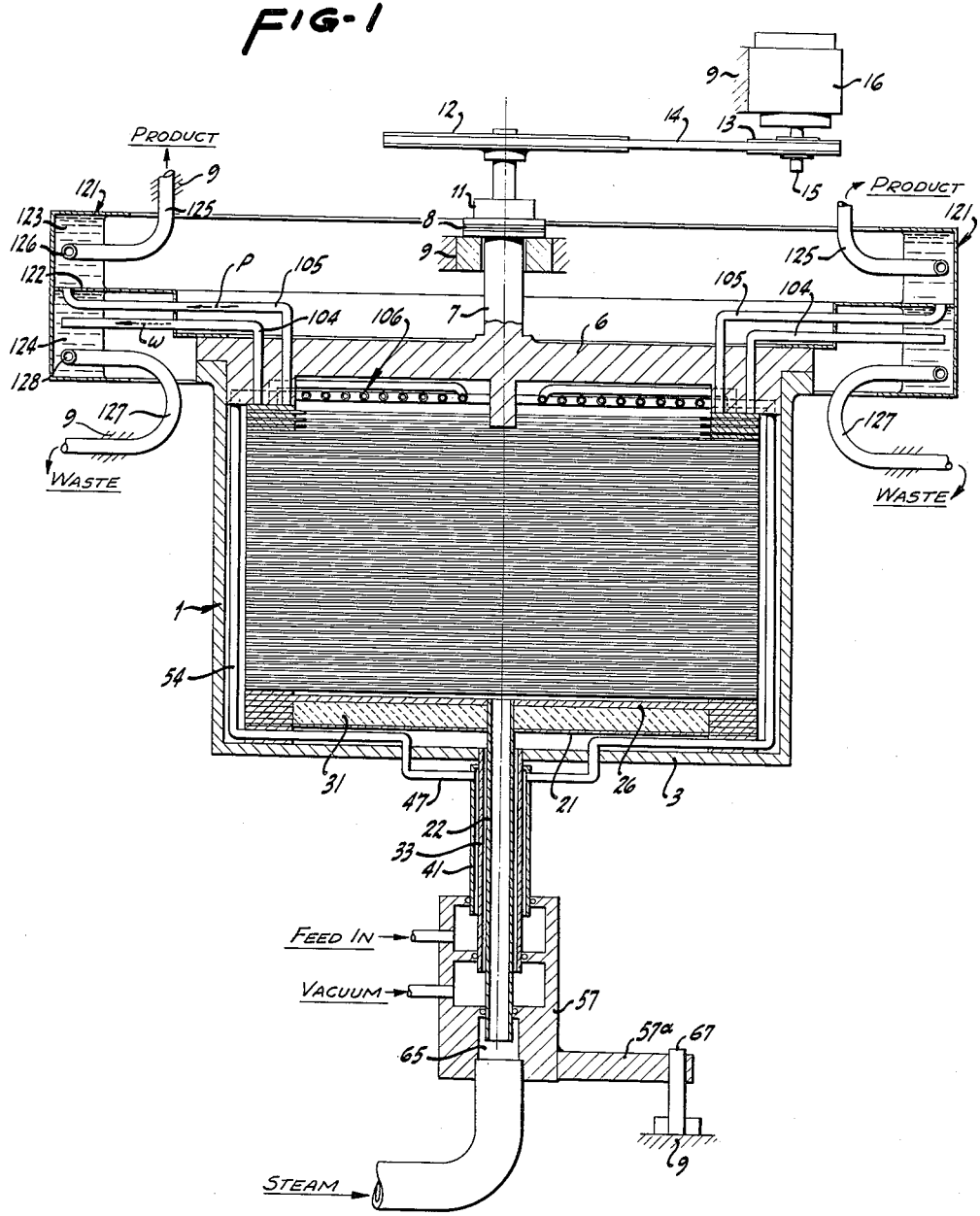
FIG. 1 is a mid-vertical section taken through an evaporator embodying the objects of my invention.

Generally, the evaporator illustrated in these various figures includes a cylindrical shell or casing suspended from its upper end from a driven shaft. Stacked in the shell or casing, and starting from the bottom thereof, is a plurality of evaporating units, each unit consisting of a first or bottom evaporator disc, a first gasket ring, a conducting ring, a second gasket ring, and a second or top evaporator disc, this latter disc also serving as the first or bottom disc of the succeeding evaporating unit. Each gasket ring is formed with arcuate slots which, with the adjacent disc and conducting ring, defines channels or conduits for the passage of fluid. Each gasket ring is also provided with holes serving to establish communication between the conduits of successive units and with open radial slots serving to establish communication between the evaporating chambers defined by contiguous discs and certain of said holes. In short, this structure serves as a heat exchanger and conduit system for feeding a salt solution to each evaporator unit and conveying pure water and brine out of the evaporator. Located in the upper end of the casing above the stacked evaporator units is a tube condenser through which the salt solution feed water passes prior to entering the evaporator units and which serves to condense any water vapor existing above the uppermost evaporator disc.

More specifically, the evaporator illustrated in said drawings includes a cylindrical shell or casing 1. Secured over the bottom of this casing 1 by bolts 2 is a bottom 3

(FIG. 4), and secured to the upper end of the casing bolts 4 (FIG. 2) is a cover 6.

Formed integrally with the cover 6, centrally thereof, is an upwardly extending shaft 7, said shaft being journaled in and by a thrust bearing 8. The bearing 8 in turn is supported on a frame member 9, and secured to the shaft 7 above the bearing 8 is a hold-down collar 11. Keyed or otherwise secured to the upper reduced end of the shaft 7 is a pulley wheel 12 arranged to be driven by a pulley 13 through a belt 14. The pulley 13 is keyed to the shaft 15 of a variable speed motor 16 mounted on a portion of the frame member 9.

Concentrically seated on the bottom 3 is a heavy spacing ring 17 having an outer diameter substantially less than the inner diameter of the shell 1, and which defines therewith a cylindrical chamber 18. Supported on the spacing ring 17 is a circular plate 21 having a central opening for the reception of an upstanding steam pipe 22 and to which the plate 21 is welded as at 23. As a result of this construction, the ring 17, plate 21, pipe 22, and bottom 3 define a cylindrical chamber 24, and which, as will presently be described, serves as a vacuum chamber.

Seated on the plate 21 is a stack of rings 25, preferably made of asbestos or other insulating material, and supported on the rings 25 is a circular plate 26 provided with a central opening for the reception of the upper end of the steam pipe 22 and to which it is welded as at 27. Recessed in the plate 26 and circumscribing the upper end of the pipe 22 is an O sealing ring 28.

Disposed within the chamber 29 defined by the plates 21 and 26 is a body 31 of thermal insulating material such as kapok.

Circumscribing the steam pipe 22, and having substantial clearance therewith, is a vacuum pipe 33. Secured to the lower face of the bottom 3 by screws 34 is a ring 35, and recessed in the upper face thereof is an O sealing ring 36 having a force fit with the lower face of the bottom 3. As best shown in FIG. 3, the ring 35 is welded to the vacuum pipe 33 as at 37, this serving as a means for suspending the pipe 33 from the bottom 3. From FIG. 3 it will also be noted that the steam pipe 22 and the vacuum pipe 33 together define an annular conduit or passageway 38 communicating at its upper end with the vacuum chamber 24.

Circumscribing the vacuum pipe 33, and having substantial clearance therewith, is a solution feed pipe 41 closed at its upper end by a ring 42. The ring 42 is sealed and secured to the pipe 33 by welding as at 43 and is sealed and secured to the pipe 41 as at 44.

Extending radially from and secured to the pipe 41 is a nipple 45, and secured to the nipple is a pipe fitting 46. Threaded into the pipe fitting is the lower end of an elbow 47 terminating at its upper end in a pipe fitting 48. The fitting 48 is in turn threaded into a boss 49 formed in the bottom 3 and communicates through a bore 51 with an elbow 52 and a radially extending feed water pipe 53 with a stand pipe 54 disposed within the chamber 18.

All of the pipe structure so far disclosed is secured and rotates with the shell or casing 1 under the influence of the motor 16.

Surrounding the pipe 41 and sealed thereto by a packing gland 56 is a fluid distributor or pipe 57 provided with a feed water inlet 58. As illustrated in FIG. 3, the inlet 58 communicates with the annular passageway 59 defined by the pipes 41 and 33 and through such passageway, and the elbows 47 and 52 with the feed water pipe 53.

Disposed below the feed water inlet 58 between the pipes 33 and 57 is a pair of axially spaced packing glands 60 and 61, and disposed between said glands is an axially expandible ring 62 for applying axial pressure to both of the glands and thus effectively sealing the feed water passageway 59 from the vacuum passageway 38.

Threaded through the pipe 57 in alignment with the ring 62a is a set screw 64a for expanding the ring 62.

Formed in the pipe 57 is a vacuum inlet 63 communicating with the vacuum passageway 38, and closing off the bottom of this passageway is a packing gland 64. As illustrated in FIG. 3, the lower open end of the pipe 57 serves as a steam inlet 65 communicating through the steam pipe 22 with the chamber 66 located immediately above the circular plate 26.

Secured to the lower end of the distributor pipe 57 is a radially extending bar 57a (FIG. 1) arranged to engage a spring finger 67 attached to a stationary frame portion 9, this structure serving to bias the pipe against rotation, but at the same time permitting the pipe to wobble in the event that the evaporator is not in perfect dynamic balance. All fluid connections with the pipe 57 should of course be made with relatively stiff hose sections, but still having some degree of flexibility so as to permit the pipe to wobble to some extent.

Stacked on the circular plates 26 is a pair of rings 71 and 72, and which preferably are made of asbestos. Supported on the ring 71 is an evaporator disc $A_1$ provided with a central circular opening or throat 73.

Stacked on the disc $A_1$ is a gasket ring $B_1$, a copper separator ring $C_1$, and a second gasket ring $D_1$. Stacked on the gasket ring $D_1$ is another set of members $A_2$, $B_2$, $C_2$, and $D_2$ identical respectively to the members $A_1$, $B_1$, $C_1$, and $D_1$. Here it should be noted that the discs $A_1$ and $A_2$ define an evaporating chamber $E_1$. In the preceding fashion, a multiple unit evaporator can be built up including any desired number of evaporating chambers E.

In FIG. 8, there is illustrated in exploded perspective disc $A_n$, gasket $B_n$, ring $C_n$, gasket $D_n$, disc $A_{n+1}$, and gasket $B_{n+1}$. The outer diameters of all of these elements are equal, and therefore where such elements are stacked and compressed their outer edges will together define a cylindrical surface having substantial clearance with the shell 1. The inner diameters of the separator rings C should be smaller than the inner diameters of the gasket rings B and D. As a result of this construction, the separator rings extend inwardly of the gasket rings and serve to divide or separate the evaporator chambers E at their peripheries into an annular lower solution collecting chamber 75 and an annular upper pure water collecting chamber 76.

Each of the discs A is provided with a pair of diametrically opposed, radially extending feed water header slots 74a and 74b; with a pair of diametrically opposed feed water distributor ports 75a and 75b; with a pair of diametrically opposed, radially extending, pure water discharge slots 76a and 76b; and with a pair of diametrically opposed waste product discharge openings 77a and 77b.

Secured to the lower end of each of the feed water distributor ports through an elbow 78 is the outer end of a tube 79. Secured and sealed to the underside of each of the discs A about the throat 73 is a feed water distributor cup 81, and here it should be noted that there is substantial clearance between the throat 73 and the floor of the cup 81. The inner end of each of the two opposed tubes 79 associated with each disc enters the distributor cup tangentially in the direction of rotation of the evaporator and as best illustrated in FIG. 5.

Since each of the gasket rings B and D and each of the separator rings C, like the discs A, are diametrically symmetrical, only one side of each of these members will here be described.

Formed in each half of the gasket rings B is an elongated circular feed water intake slot 83, an open waste water discharge channel or inlet port 84 and a pure water discharge port 85.

Each half of each of the gasket rings D is provided with a feed water intake slot 87, with an open pure water intake channel 88, and with an elongated, circular, pure water discharge channel or slot 89, and with a similar and paralleling salt water waste discharge slot or channel 91.

The annular orientation of the discs A, gasket rings B, separator rings C, and gasket rings D, relative to each other is diagrammatically illustrated in FIG. 8 and can be traced by reference to the flow lines of the three liquids involved. In this figure the flow of feed water (sea water, for example) has been indicated by solid lines; the pure water or end product P evaporated and condensed from the feed water has been indicated by dot-dash lines; and the waste or non-evaporated portion of the feed water by dotted lines.

As thus indicated in FIG. 3 it will be seen that the feed water F entering the upper channel 83 flows clockwise therethrough to the right hand end of this channel. At this point the channel is in communication with the water feed intake port or slot 74b and also with the feed water distributor port 75b. A relatively small portion of the feed water passes through the port 75b into the outer end of the feed water tube 79 associated therewith. Since the pressure under which the feed water is introduced into the evaporator is substantially greater than any centrifugal force to which the feed water may be subjected as a result of the rotation of the evaporator, feed water will flow inwardly through the tube 79 and be discharged at the inner end thereof tangentially into the feed water distributor cup 81 associated with the adjacent evaporator disc A, or more precisely $A_{n+1}$ (FIGS. 2, 5, and 6). Some of the feed water contained in the cup 81 continuously climbs over the cup throat 73 and flows as a film radially outward over the upper face of the disc $A_{n+1}$. As will be presently described in greater detail, the disc $A_{n+1}$ is maintained at a slightly greater temperature than the temperature of the overlying disc $A_{n+2}$, and consequently some evaporation from the film of feed water flowing over the surface of the disc $A_{n+1}$ takes place. The resulting vapor condenses on the lower side of the disc $A_{n+2}$, and the condensate adheres to the disc $A_{n+2}$ and flows outwardly to the confining gasket B, or in this particular case, $B_{n+1}$.

The feed water F passing through the port or slot 74b of the disc $A_{n+1}$ continues downwardly through registering slot 87 of the gasket ring $D_n$, through a registering port or slot 92 formed in the underlying separator ring $C_n$ and into the right hand end of the right hand slot or channel 83 of the gasket ring $B_n$. The feed water F then flows clockwise along the channel 83 and at the left end thereof. Most of the feed water enters the port 74 of the disc $A_n$. The remainder of the feed water enters the port 75 and passes inwardly through one of the feed water distributor tubes 79 to the distributor cup 81 associated therewith. In this fashion, the feed water progresses downwardly through the evaporator to its lowermost evaporator disc. Each time that the feed water F comes into communication with one of the ports 75a or 75b some of it passes therethrough into its associated feed water distributing tube 78 for distribution to and over the surface of the disc A associated with the particular tube 79 in question. It will therefore be appreciated that the slots or channels 83, and the slots 74, 87, and 92 together form a feed water header for distributing feed water through each of the ports 75a and 75b to the upper surface of each of the evaporator discs A. The bottom of such header is blanked off by the gasket ring 72. It should here be noted that, as illustrated, there are two such headers and that consequently feed water is fed to each distributor cup 81 at diametrically opposed points, pinwheel fashion. During the initial stages of the operation of the evaporator each of the feed water headers is completely filled with feed water, which is delivered to the distributor cups 81 at line pressure.

Now returning to the flow paths of the pure water condensate and the slightly concentrated feed water waste.

As previously pointed out, the unevaporated portion of the feed water which travels radially outward over the upper surface of each evaporator disc A passes under the overhanging portion of the separator ring C and passes through the diametrically opposed notches or open waste water channels 84 of the gasket ring B. At this point this water can be considered as waste water and is designated by the letter W. Each of the channels is in registration with a port 94 formed in the overlying separator ring C and with one end of the waste water channel 91 formed in the gasket ring D overlying the separator disc under consideration. The waste water W traverses this channel counterclockwise and counter to the direction of rotation of the separator, and then passes upwardly through the port 76b of the next succeeding and overlying evaporator disc A, and through the registering port 85 of the next succeeding and overlying gasket ring. In this fashion, the waste water from each evaporator disc travels upwardly through and around the periphery of the evaporator to its point of discharge which will be detailed presently.

Now considering the flow path of the condensate or pure water or end product P passing along the underside of each of the evaporator discs A and which enters the underlying collecting chamber 76. Particular reference is here had to the film of condensate or pure water moving outwardly along the lower surface of the evaporator disc $A_{n+1}$ and entering the open channel 88 of the gasket ring $D_n$. The end product P here meets a column of pure water passing upwardly through a port 95 formed in the underlying separator ring $C_n$ and the port 85 of the gasket ring $B_n$. The merged product enters the inner channel 89 of the gasket ring $D_n$, flows counterclockwise to the right hand end of this channel, and then passes upwardly through the port 76b of the evaporator disc $A_{n+1}$ and through the port 85 of the gasket ring $B_{n+1}$. In this fashion, the condensate or end product P from each of the evaporator discs progresses upwardly and around the evaporator to a point of discharge.

Stacked on the uppermost or terminal gasket ring $D_{n+x}$ is one or more spacing gasket rings 101 each provided in its diametrically opposed sides with a waste water discharge port 102 and with an end porduct discharge port 103 arranged to register and communicate respectively with the discharge ends of channels 91 and 89 of the terminal gasket ring $D_{n+x}$.

Here it should be noted that the number and thickness of the spacing gasket rings 101 should be such that when the casing cover 6 is screwed home, all of the underlying discs, gasket rings, and separator rings will be placed under compression and together form a fluid-tight evaporator cylinder.

Extending through the cover 6 and communicating respectively with the ports 102 and 103 is a waste water discharge conduit 104 and an end product discharge conduit 105.

Figure 7:
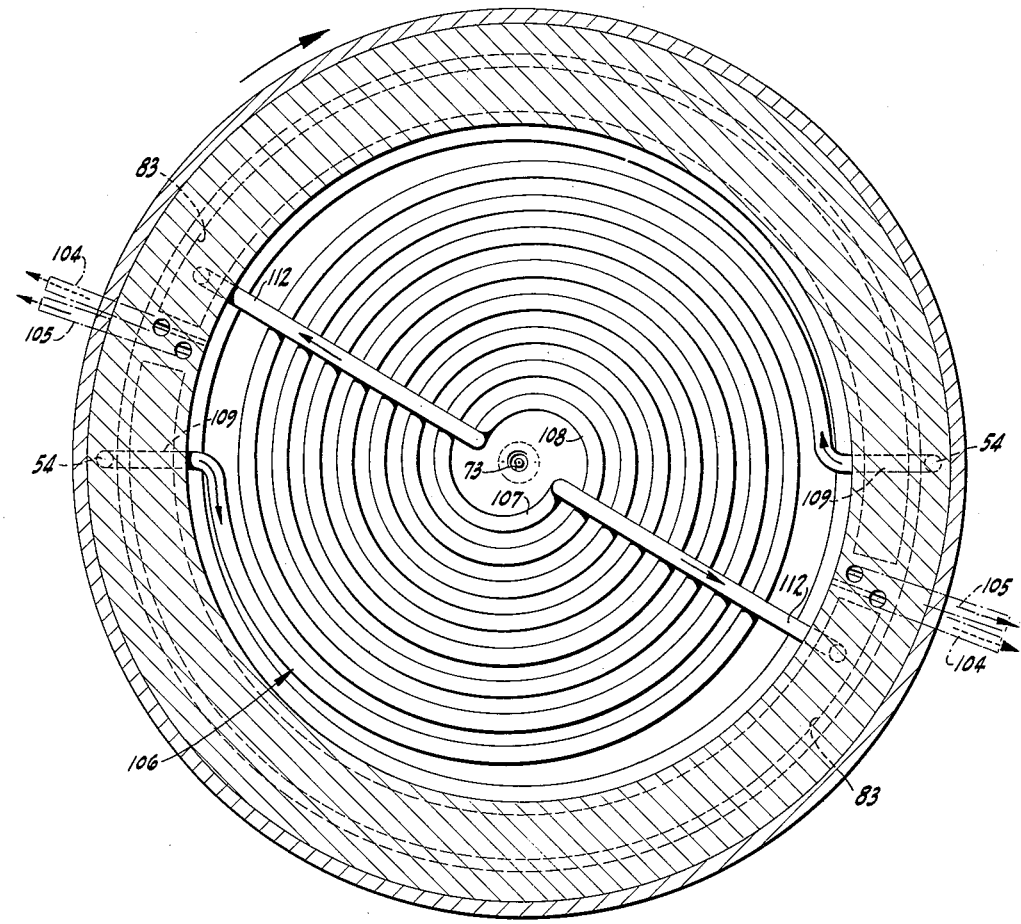
FIG. 7 is a horizontal section taken on the section line 7—7 of FIG. 2.

Mounted on the underside of the cover 6 is a condenser 106 (FIG. 7) consisting of a pair of copper helical coils 107 and 108, each having an inlet end 109 connected with one of the diametrically opposed stand pipes 54 through a fitting 111, and each having a discharge end 112 communicating through registering ports formed in the spacing gasket rings with the inlet end of the channel 83 of the underlying gasket ring $B_{n+x}$.

As a result of this construction, the feed water entering the feed water headers of the evaporator first passes through the condenser coils, and in so doing, its temperature is raised through several degrees. This results from the fact that the underlying evaporator disc $A_{n+x}$ is maintained at a slightly higher temperature than the temperature of the condenser coils. Evaporation of feed water passing over the disc $A_{n+x}$ takes place, and the resulting water vapor condenses on the condenser coils. This condensate travels outwardly, progressing from one coil convolution to the next and is finally collected above the separator ring $D_{n+x}$ to thereafter join the upwardly traveling column of pure water or end product. Although some of this condensate may drop to the underlying evaporator disc, most of its is recovered.

To relieve the evaporating chambers of my evaporator of entrained air released from the feed water, each of the evaporator discs A is provided with a bleed hole 113 which preferably should be staggered. To the same end, an air eduction tube 114 establishes communication between the chamber 66 and the vacuum chamber 24. Since the chamber 24 communicates through pipe 33 with a suitable source of vacuum, each of the evaporating chambers E can be bled of air. Although this results in the loss of some water vapor, this is a factor which cannot be avoided. Here it should be noted that the bleed holes 113 should progressively increase in size from the bottom to the top of the evaporator. To this end the inner diameter of the air eduction tube 114 may be in the order of .013 inch, and the diameter of the bleed holes 113 of the uppermost disc $A_{n+x}$ may be in the order of 3/8 inch. This expedient is resorted to even though it is contemplated that the feed water will be deaerated prior to introduction into the evaporator.

As previously described, the pipe 22 communicates with a suitable source of steam and serves to introduce steam into the chamber 66 located immediately beneath the first and lowermost evaporator disc $A_1$. This results in heating the disc $A_1$ to a temperature slightly above the temperature of the next succeeding disc $A_2$, to the end that evaporation of feed water from the upper surface of the disc $A_1$ will take place and that the resulting water vapor will condense on the lower surface of the overlying disc $A_2$. The unevaporated feed water which has now become waste water and which has taken on some calories from disc $A_1$ passes into the open channel 84 of the gasket ring $B_1$, upwardly through the port 94 of the separator ring into the channel 91 of the gasket ring $D_1$. Before this waste water rises again through the next unit, it travels counterclockwise through the circular channel a matter of almost 180 degrees. This channel, however, is closed at its top and bottom respectively by disc A and separator ring C, both of which are made of copper and therefore good thermal conductors. There the waste water in passing through the channel 91 takes on some calories from the separator ring C and gives up some calories to the disc $A_2$. The copper evaporator discs therefore also constitute a heat exchanger for recovering heat from the waste water as it travels in semicircular increments around the evaporator walls and upwardly therethrough. These members also serve as a heat exchanger as well as a manifold for the feed water during the semicircular incremental travel of the feed water as it progresses downwardly through the separator. Here, however, the feed water takes heat from each evaporator disc of the assembly. In short, the feed water takes on calories as it progresses downwardly, and the waste water gives up heat as it moves upwardly in counter current fashion. Since the flow of the pure water or end product in general parallels the flow of the waste water, it also gives up heat to the system as it passes therethrough.

To recover the pure water or end product P and the waste water W from the evaporator, the upper end of the casing 1 is circumscribed by an inwardly facing annular collecting channel 121 fastened to the casing 1 in any suitable manner for rotation therewith and provided with an annular divider ring 122. The ring 122 divides the channel 121 into an upper pure water or end product collecting chamber 123 and into a lower waste water collecting chamber 124. Suspended adjacent the chamber 123 from a portion of the frame 9 is an end product collecting conduit 125 terminating in a cone-shaped scoop 126 disposed within the chamber 123 and which is directed upstream into the advancing end product. Similarly, a waste water collecting conduit 127 is suspended from a portion of the frame 9 with the end thereof disposed in the chamber 124, this end likewise being provided with a scoop 128 facing upstream into the oncoming waste water.

As best illustrated in FIG. 8, each of the gasket rings D (see the ring $D_n$) is provided with recesses 131 for accommodating the outer end of the elbow 78 of the overlying feed water distributing tube 79.

Although none of the dimensions of the evaporator above described are critical, nor are the materials from which it is made, it might be observed that the evaporator discs, separator rings, and gasket rings may be made of a diameter in the order of 4 feet; that the evaporator may be conveniently made of 30 units (30 evaporator discs and associated separator and gasket rings); that the gauge or thickness of the evaporator discs and separator rings may be in the order of 3/32 inch with the gauge or thickness of the asbestos gasket rings in the order of 3/16 inch so that a clearance between adjacent evaporator discs exists in the order of 1/2 inch. Although this latter dimension is not critical, it is important to note that since this is the depth of each of the evaporator chambers, the pressure drop within each chamber is very slight.

Steam for heating the lowermost evaporating disc can be introduced into the steam inlet line at 15 lbs. p.s.i. absolute pressure and which should result in heating the lower disc to about 220 degrees F. About one lb. of steam per 20 lbs. of the pure water end product should be sufficient. Feed water at about 60 degrees F. (ambient temperature) can be introduced into the feed water inlet of the system at line pressure (about 75 lbs. p.s.i.). A vacuum in the order of 1/2 lb./sq. in. abs. should be maintained in the inlet of the vacuum line.

Under these conditions there should be a sufficient drop in the temperature between each succeeding evaporator disc to evaporate pure water from the floor of each disc and to condense such water vapor on the lower surface of the succeeding disc.

I claim:

1. A centrifugal evaporator chamber comprising: a lower first metal evaporator disc; a first gasket ring coaxially stacked on said first evaporator disc; a metal separator ring coaxially stacked on said first gasket ring; a second gasket ring coaxially stacked on said separator ring; an upper second disc stacked on said second gasket ring; a feed water inlet port formed in said second gasket ring above said separator ring; a conduit mounted on the lower face of said first disc communicating between said inlet port and the central portion of the upper face of said first disc; a waste water port formed in said first gasket ring below said separator ring; a condensate inlet port formed in said second gasket ring above said separator ring; and means for compressing said discs and rings thereby to form a fluid-tight evaporator chamber.

2. A centrifugal evaporator chamber of the character set forth in claim 1 wherein said first disc is provided on its lower face with a central feed water distributor cup communicating with the upper face of said first disc and wherein the inner end of said conduit is in communication with said feed water distributor cup.

3. A centrifugal evaporator chamber of the character set forth in claim 1 wherein first gasket ring is provided with an elongated circular feed water channel communicating at one of its ends with said feed water inlet port and communicating at its other end with a feed water outlet formed in said first disc, and wherein said second gasket ring is provided with an elongated circular channel communicating at one of its ends with said waste water port and communicating at its other end with a waste water outlet formed in said upper second disc.

4. A centrifugal evaporator chamber of the character set forth in claim 1 wherein said second gasket ring is formed with a first elongated circular waste water channel communicating at one end with said waste water port and communicating at its other end with a waste water outlet port formed in said first gasket ring; wherein said first gasket ring is provided with a first elongated feed water channel communicating at one end with said feed water inlet port and communicating at its other end with a feed water outlet formed in said first disc; and wherein said second gasket ring is provided with a second elongated circular channel communicating at one end with said condensate inlet port, the other end of said second channel being in communication with a condensate outlet port formed in said upper second disc.

5. A centrifugal evaporator chamber of the character set forth in claim 2 wherein said second gasket ring is formed with a first elongated circular waste water channel communicating at one end with said waste water inlet port and communicating at its other end with a waste water outlet formed in said first gasket ring; wherein said first gasket ring is provided with an elongated feed water channel communicating at one end with said feed water inlet port and communicating at its other end with said conduit; and wherein said second gasket ring is provided with a second elongated circular channel communicating at one end with said condensate inlet port, the other end of said second channel being in communication with a condensate outlet port formed in said second disc.

6. A centrifugal evaporator comprising: a multiplicity of stacked evaporator chambers each of the character described in claim 5, but wherein the said second disc of each said chamber serves as a first disc of the succeeding chamber.

7. A centrifugal evaporator chamber comprising: a lower first metal evaporator disc; a first gasket ring coaxially stacked on said first evaporator disc; a metal separator ring coaxially stacked on said first gasket ring; a second gasket ring coaxially stacked on said separator ring; the inner diameters of said gasket rings being equal to each other and greater than the inner diameter of said separator ring; an upper second disc stacked on said second gasket ring; a feed water inlet port formed in said second gasket ring above said separator ring; a conduit mounted on the lower face of said first disc communicating between said inlet port and the central portion of the upper face of said first disc; a waste water outlet port formed in said first gasket below said separator ring; a condensate inlet port formed in said first gasket below said separator ring; and means for compressing said discs and rings thereby to form a fluid-tight evaporator chamber.

References Cited in the file of this patent

UNITED STATES PATENTS

| | | |
|---|---|---|
| 394,208 | Peck | Dec. 11, 1888 |
| 1,056,385 | Walker | Mar. 18, 1913 |
| 2,218,240 | Hickman | Oct. 15, 1940 |
| 2,348,020 | Norris | May 2, 1944 |
| 2,392,021 | Wildermuth | Jan. 1, 1946 |
| 2,582,871 | Kintner | Jan. 15, 1952 |
| 2,894,879 | Hickman | July 14, 1959 |